H. D. SKILES.
WHEEL PULLER.
APPLICATION FILED FEB. 19, 1921.
1,427,976.
Patented Sept. 5, 1922.
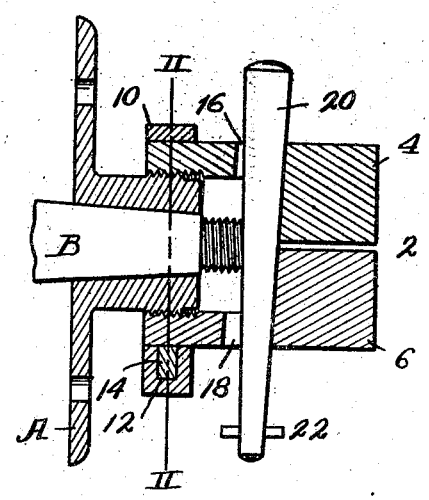
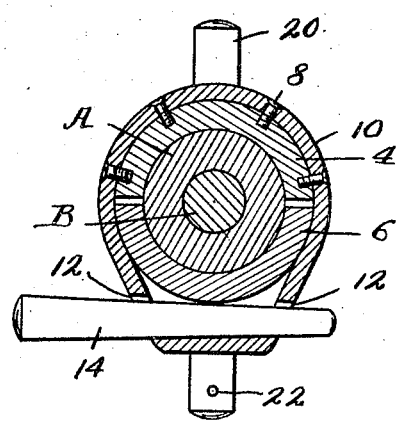
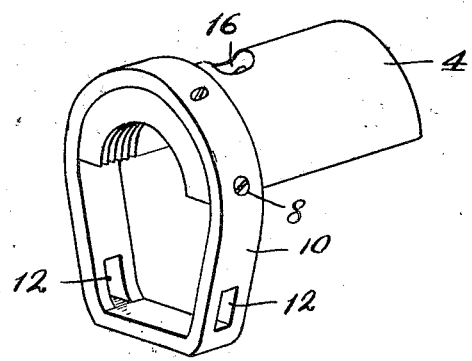
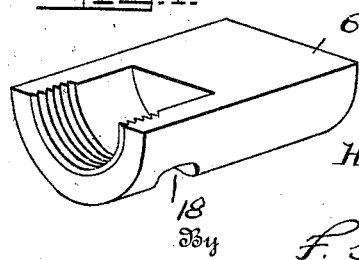
Witness:
Dred G. Fischer.
Inventor:
Henry D. Skiles,
By F. G. Fischer,
Attorney Patented Sept. 5, 1922.

1,427,976

UNITED STATES PATENT OFFICE.

HENRY D. SKILES, OF KANSAS CITY, MISSOURI.

WHEEL PULLER.

Application filed February 19, 1921. Serial No. 446,254.

*To all whom it may concern:*

Be it known that I, HENRY D. SKILES, a citizen of the United States, residing at Kansas City, in the county of Jackson and State of Missouri, have invented certain new and useful Improvements in Wheel Pullers, of which the following is a specification.

My invention relates to improvements in wheel pullers and one object is to provide a relatively simple, inexpensive and powerful device of this character which can be readily applied to the hub of a wheel for the purpose of pulling the same from a tightly fitting shaft.

A further object is to provide a device of this character which can be more quickly applied to a wheel hub and actuated to pull the wheel from its shaft, than other devices employing a slow-acting screw with which to obtain sufficient power to pull the wheel.

In order that the invention may be fully understood, reference will now be had to the accompanying drawing, in which:

Fig. 1 is a vertical longitudinal section of the device applied to the hub of a wheel.

Fig. 2 is a cross section on line II—II of Fig. 1.

Fig. 3 is a detail perspective view of one of the sleeve members and a retaining member.

Fig. 4 is a detail perspective view of the companion sleeve member.

Referring now in detail to the various parts, A designates a wheel hub which is tightly mounted upon a shaft B and threaded near its outer end to receive a cap (not shown) for covering the outer end of the shaft B.

2 designates a divided sleeve comprising a pair of members 4 and 6 internally threaded at one end for engagement with the external threads on the hub A. The sleeve member 4 is secured by suitable means such as screws 8 to a retaining member 10 in which the companion sleeve member 6 is removably mounted. The retaining member 10 is provided at its lower end with slots 12 to receive a tapered key 14. The sleeve members 4 and 6 have registering openings 16 and 18, respectively, for the passage of a wedge member 20 provided at its lower end with a transverse pin 22 to prevent its withdrawal from said openings 16 and 18.

In practice the two sleeve members 4 and 6 are moved apart and slipped over the wheel hub A until their threaded ends are in position to engage the threads on said wheel hub. The sleeve members 4 and 6 are then caused to quickly and firmly engage the threads of the wheel hub A by driving the tapered key 14 through the slots 12 in the lower portion of the retaining member 10. As the key 14 is driven through the slots 12 its upper inclined surface engages the under portion of the sleeve member 6 and forces the same upwardly into engagement with the threaded portion of the hub A and pulls the sleeve member 4 downwardly into engagement with said threaded portions of the hub A through the instrumentality of the retaining member 10, which is forced downwardly by the underside of said key 14.

After the sleeve members 4 and 6 are thus firmly clamped into engagement with the threaded portion of the wheel hub A, the wedge member 20 is driven through the openings 16 and 18 during which operation it engages the end of the shaft B, upon which it exerts sufficient pressure to force the sleeve members 4 and 6 longitudinally, thereby causing them to loosen the wheel hub A from said shaft B. After the wheel has been removed from the shaft B the device can be readily removed from the hub A by loosening the key 14 and the wedge 20, after which the sleeve members 4 and 6 can be moved apart far enough to disengage the threaded portion of said hub A.

From the foregoing description it is apparent that I have produced a powerful and quick-acting device in which no slow-acting screws are employed to obtain the necessary power for pulling the wheel from the shaft, and while I have shown and described the preferred construction, a combination and arrangement of parts, I reserve the right to make such changes as properly fall within the spirit and scope of the claims.

Having thus described my invention, what I claim and desire to secure by Letters Patent, is:

1. A wheel puller consisting of a divided sleeve having an opening laterally therethrough and a retaining member in which one member of the sleeve is firmly secured the companion member being removably mounted, a tapered element for engagement with the retaining member and the removable sleeve member to force the latter and its companion firmly into engagement with the wheel to be pulled, and a member adapted to be driven through said opening and bear against the end of the wheel shaft to force the sleeve longitudinally and loosen the wheel from said shaft.

2. A wheel puller consisting of a divided sleeve having registering opening therethrough threaded at one end for engagement with threads on the hub of a wheel to be pulled, a retaining member having an opening therethrough and in which one member of the sleeve is firmly secured, the companion member being removably mounted, a tapered element adapted to be driven through the opening in said retaining member and engaging the removable sleeve member to force the same and its companion firmly into engagement with the wheel hub, and a wedge member to be driven through said openings in the sleeve members for engaging the end of the wheel shaft to exert sufficient pressure thereon to move the sleeve longitudinally and loosen the wheel hub from said shaft.

In testimony whereof I affix my signature, in the presence of two witnesses.

HENRY D. SKILES.

Witnesses:
  FRED C. FISCHER,
  L. J. FISCHER.